United States Patent
Keen et al.

(10) Patent No.: US 11,117,628 B2
(45) Date of Patent: Sep. 14, 2021

(54) TRAY DECK MOUNTING APPARATUS WITH ADJUSTABLE SPACER

(71) Applicant: Aluminum Industries Investments Pty Ltd, Brighton (AU)

(72) Inventors: Matthew Keen, Brighton (AU); Robin Norman, Brighton (AU)

(73) Assignee: Aluminum Industries Investments Pty Ltd, Brighton (AU)

( * ) Notice: Subject to any disclaimer, the term of this patent is extended or adjusted under 35 U.S.C. 154(b) by 89 days.

(21) Appl. No.: 16/685,154

(22) Filed: Nov. 15, 2019

(65) Prior Publication Data

US 2020/0079438 A1   Mar. 12, 2020

Related U.S. Application Data

(63) Continuation of application No. PCT/IB2018/053476, filed on May 17, 2018.

(30) Foreign Application Priority Data

May 17, 2017   (AU) ................................ 2017901869
Jan. 19, 2018   (AU) ................................ 2018900171

(51) Int. Cl.
*B62D 33/02* (2006.01)
*B62D 24/00* (2006.01)
*B62D 65/02* (2006.01)

(52) U.S. Cl.
CPC ............. *B62D 33/02* (2013.01); *B62D 24/00* (2013.01); *B62D 65/024* (2013.01)

(58) Field of Classification Search
CPC ....... B62D 24/00; B62D 33/02; B62D 65/024

USPC .................................................. 296/184.1, 3
See application file for complete search history.

(56) References Cited

U.S. PATENT DOCUMENTS

| | | | |
|---|---|---|---|
| 4,773,598 A | 9/1988 | Jones | |
| 5,431,472 A * | 7/1995 | Coffland | ................... B60R 9/00 224/403 |
| 6,120,235 A | 9/2000 | Humphries et al. | |
| 6,733,067 B1 * | 5/2004 | Miskech | ............ B62D 25/2054 296/183.1 |
| 2004/0074940 A1 * | 4/2004 | Aftanas | ..................... B60R 9/00 224/403 |
| 2007/0222259 A1 * | 9/2007 | Oliver | ....................... B60P 1/28 296/184.1 |
| 2008/0217945 A1 | 9/2008 | Barnes | |

(Continued)

OTHER PUBLICATIONS

International Search Report, International Application No. PCT/IB2018/053476.

(Continued)

*Primary Examiner* — Gregory A Blankenship
(74) *Attorney, Agent, or Firm* — Richard A. Fagin

(57) ABSTRACT

Apparatus (102) for connecting an object (104) to a part of a vehicle (106), the mounting apparatus (102) including two or more of a first mechanism (108) adjustable in a direction substantially parallel with respect to the left-right axis of the vehicle, a second mechanism (110) adjustable in a direction substantially parallel with respect to the front-to-rear axis of the vehicle, and a third mechanism (112) adjustable in a direction substantially parallel with respect to the vertical axis of the vehicle.

16 Claims, 16 Drawing Sheets

(56) References Cited

U.S. PATENT DOCUMENTS

| | | | |
|---|---|---|---|
| 2015/0274060 A1* | 10/2015 | Welch ................ | B62D 25/2054 |
| | | | 296/184.1 |
| 2016/0059906 A1 | 3/2016 | Leitner | |
| 2017/0028900 A1* | 2/2017 | Stocks ...................... | B60P 3/42 |
| 2017/0057392 A1* | 3/2017 | Killgour ................... | B60P 1/16 |
| 2019/0135198 A1* | 5/2019 | Beet ....................... | B62D 33/02 |
| 2019/0193794 A1* | 6/2019 | Beet ....................... | B62D 43/02 |
| 2020/0079438 A1* | 3/2020 | Keen ..................... | B62D 33/02 |
| 2020/0079440 A1* | 3/2020 | Keen ................. | B62D 25/2054 |
| 2020/0391809 A1* | 12/2020 | Urban .................... | B60R 13/01 |
| 2020/0406985 A1* | 12/2020 | Zhu .......................... | B60R 9/06 |

OTHER PUBLICATIONS

Written Opinion, International Application No. PCT/IB2018/053476.

Thule 422XT Xsporter Pickup Truck Aluminum Bed Ladder Rack and Technical Support and Instructions for Praline Products, Inc.

* cited by examiner

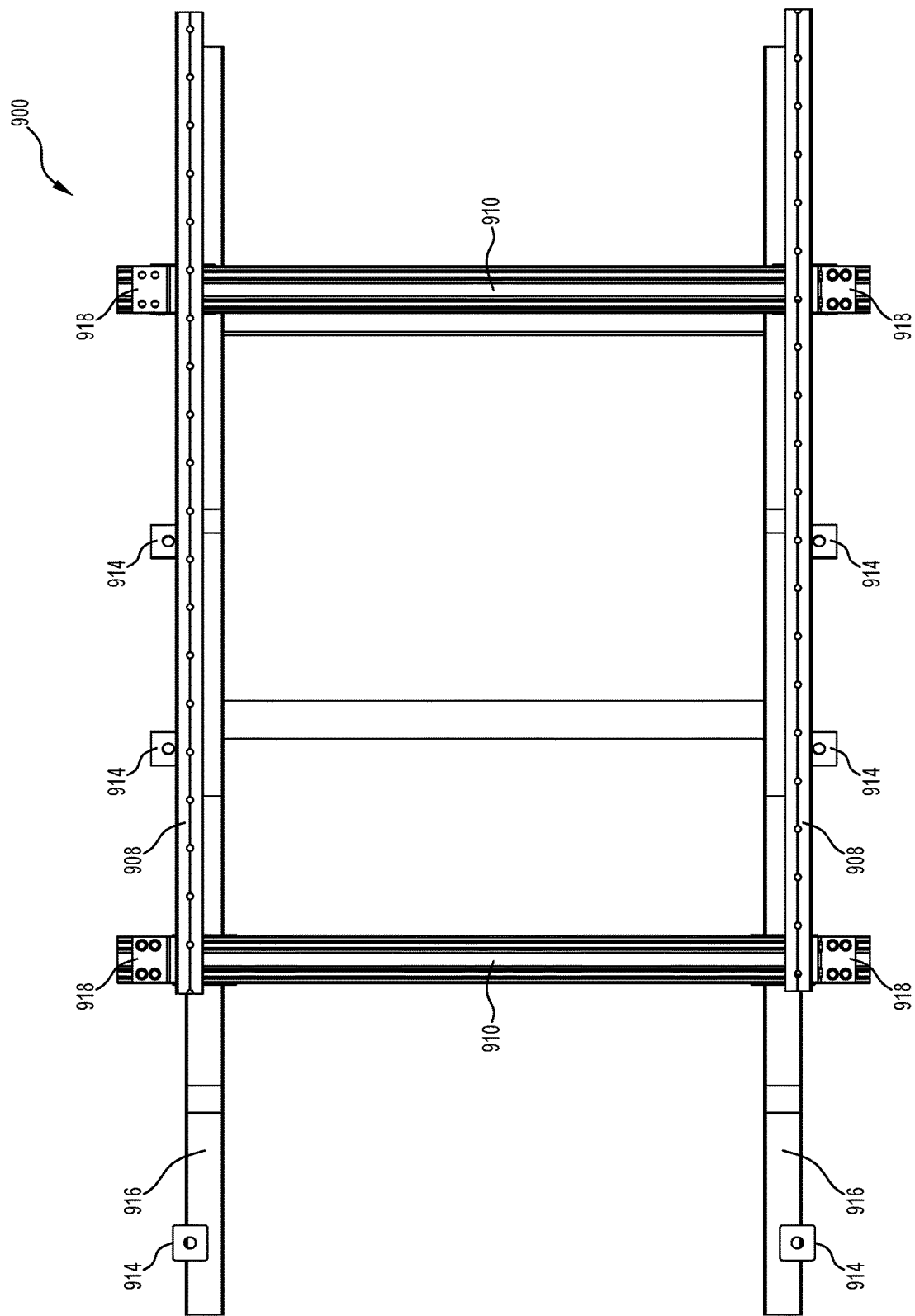

TRAY DECK MOUNTING APPARATUS WITH ADJUSTABLE SPACER

CROSS-REFERENCE TO RELATED APPLICATIONS

Continuation of International Application No. PCT/IB2018/053476 filed on May 17, 2018. Priority is claimed from Australian application no. 2017901869 filed on May 17, 2017 and Australian application no. 2018900171 filed on Jan. 19, 2018. All the foregoing applications are incorporated herein by reference.

BACKGROUND

The present invention relates to decks and tray decks for vehicles, and particularly relates to decks and tray decks for utility type vehicles.

Utility vehicles, sometimes referred to as utes, pick-ups or pick-up trucks, typically are equipped with a tray or tray deck at the rear of the vehicle, which serves to carry loads of various types. The loads may include equipment, sand, gravel and various other kinds of items and materials.

Some utility vehicles have a flat area, which may be referred to as a tray, a cargo bed or a deck. Other utility vehicles have a flat area which is surrounded by up to four sides to form a container, which may also be referred to variously as a tray or a cargo bed. The sides may be fixed or moveable, and may be a combination of fixed and moveable sides. Sometimes the side at the back is referred to as a tail gate.

In this specification, for consistency and ease of understanding, the vehicle will be referred to as a utility or utility vehicle; the flat area will be referred to as a deck; each of the sides will be referred to as side gates (front, rear, left and right); and the deck and side gates together (whether there be one, two, three or four side gates) will be referred to as a tray deck.

In some utility vehicles, the sides of the tray deck are fixed in position, the deck and sides forming what is sometimes referred to as a tub. In other utility vehicles, one or more of the sides are moveable between open and closed configurations. In this specification, unless otherwise indicated, the term side gate will refer to a side of a tray deck, wherein the side gate is moveable at least between open and closed positions. Some utility vehicles have side gates which are detachable. Typically, if a utility vehicle tray deck has a front side (usually adjacent a cab of the utility vehicle), the front side is in a fixed position, and in this specification the front side may be referred to as a fixed side or also referred to as a side gate, though it will be understood that the front side is typically in a fixed position.

Typically, a deck or tray deck will be provided with a utility vehicle when sold to a customer. The type of tray deck is either dictated by the model of the vehicle or there may be a very limited range of options available from which a customer can select.

It is also possible to buy utility vehicles without a deck or tray deck fitted, and the customer can select a deck or tray deck for their vehicle after purchase, but the customer will have a very limited range of options for a deck or tray deck.

Further, decks and tray decks are typically manufactured or supplied as a single unit, and can be fitted only to one vehicle model or a very limited range of vehicle models. Such units are bulky, which causes them to be inconvenient and expensive to transport, for example, form a place of manufacture to a place where the deck or tray deck is to be fitted to a utility vehicle.

Many decks and tray decks are not configurable or may have very limited options for configuration. A customer may want to include various features to make a deck or tray deck more suitable for that customer's intended use of the utility vehicle.

Further, many decks or tray decks are adapted to only one vehicle, or a limited range of vehicles, as connection means on the deck or tray deck align only with the one vehicle or limited range of vehicles. The problem of connecting an object to a vehicle or vehicle chassis is not restricted to decks, tray decks or other kinds of rear containers for utility vehicles, and may apply to containers on trucks and other vehicles.

It is an object of the present invention to overcome, or at least ameliorate, at least one of the above-mentioned problems in the prior art, and/or to overcome, or at least ameliorate, at least one problem in the prior art, which has not been mentioned above and/or to provide at least a useful alternative to prior art devices, systems and/or methods.

SUMMARY

In one aspect, the present invention provides mounting apparatus for connecting an object to a part of a vehicle, the mounting apparatus including:

two or more of:

a first mechanism adjustable in a direction substantially parallel with respect to the left-right axis of the vehicle;

a second mechanism adjustable in a direction substantially parallel with respect to the front-to-rear axis of the vehicle; and a third mechanism adjustable in a direction substantially parallel with respect to the vertical axis of the vehicle;

wherein by adjustment of one or more the first mechanism, the second mechanism, and the third mechanism, an upper portion of the mounting apparatus aligns to connect with the object and a lower portion of the mounting apparatus aligns to connect with the part of the vehicle.

In another aspect, the present invention provides a method for mounting an object to a part of a vehicle, the method including:

two or more of:

adjusting a first mechanism in a direction substantially parallel with respect to the left-right axis of the vehicle;

adjusting a second mechanism in a direction substantially parallel with respect to the front-to-rear axis of the vehicle; and adjusting a third mechanism in a direction substantially parallel with respect to the vertical axis of the vehicle;

wherein by adjustment of one or more the first mechanism, the second mechanism, and the third mechanism, an upper portion of one of the first, second, or third mechanism aligns to connect the object and a lower portion of the first, second, or third mechanism aligns to connect with the part of the vehicle.

In another aspect, the present invention provides a system for mounting an object to a part of a vehicle, the system including:

an object connector on the object;

a vehicle connector on the part of the vehicle; and, mounting apparatus including:

two or more of:

a first mechanism adjustable in a direction substantially parallel with respect to the left-right axis of the vehicle;

a second mechanism adjustable in a direction substantially parallel with respect to the front-to-rear axis of the vehicle; and a third mechanism adjustable in a direction substantially parallel with respect to the vertical axis of the vehicle;

wherein by adjustment of one or more the first mechanism, the second mechanism, and the third mechanism, an upper portion of the mounting apparatus aligns to connect with the object connector and a lower portion of the mounting apparatus aligns to connect with the vehicle connector, such that the object can be connected to the vehicle via the mounting apparatus.

SUMMARY OF SOME OPTIONAL EMBODIMENTS

In embodiments, the mounting apparatus further includes, at an upper portion of the mounting apparatus, a connector for connecting a tray to the mounting apparatus, and, at a lower portion of the mounting apparatus, a connector for connecting a utility vehicle to the mounting apparatus.

In other embodiments, object is a deck or a tray deck for a utility vehicle. In such embodiments, the vehicle is a utility vehicle.

In yet other embodiments, the part of the vehicle is the rear of the vehicle. In further embodiments, the part of the vehicle is the chassis of the vehicle.

In yet further embodiments, the first mechanism includes two or more rails, each rail having a longitudinal axis substantially parallel with the front-to-rear axis of the vehicle.

In embodiments, the second mechanism includes two or more rails, each rail having a longitudinal axis substantially parallel with the left-right axis of the vehicle.

In other embodiments, the second mechanism includes slidable brackets, which slide along rails. In other such embodiments, the rails may form a component of the third mechanism.

In yet other embodiments, the third mechanism includes one or more inserts which are operable to be placed at one or more selected positions, the inserts further operable to be stacked to form columns, wherein, by increased stacking, the columns are adjustable in height to provide the adjustment in a direction substantially parallel with respect to the vertical axis of the vehicle. In some embodiments, the inserts comprise substantially square cross-sectioned tubular sections. In yet other embodiments, the inserts are each the same size vertically. In further embodiments, the inserts may have a range of different sizes, which can allow for selected vertical adjustment of the mounting apparatus.

In alternative embodiments, the third mechanism includes a threaded mechanism adjustable to increase distance between ends of the threaded mechanism. In some such embodiments, the threaded mechanism includes a first section with an external thread and a second section with an internal thread.

In embodiments, a lower-most insert or lower part of the third mechanism may be angled to align with correspondingly angled vehicle connector.

In some embodiments, the object connector is located on a substantially planar lower surface of the object. In such embodiments, by adjustment of one or more the first mechanism, the second mechanism, and the third mechanism, an upper portion of the mounting apparatus aligns to connect with a substantially planar lower surface of the object and a lower portion of the mounting apparatus aligns to connect with the part of the vehicle.

In other embodiments, the third mechanism includes a spacer component, operable with another like spacer component as an adjustable spacer, the spacer component including one or more arms, each arm including a plurality of substantially parallel rails depending therefrom, the plurality of rails evenly offset from each other along the arm, wherein, when operated with another like spacer component, at least one rail on each arm of one spacer component is configured to slidably engage between two adjacent rails on each arm of the other spacer component along a slide axis, such that, when slidably engaged, the spacer components are prevented from moving relative to each other except along the slide axis, and wherein, when operated with another like spacer component, the spacer components form a spacer having two or more selectable spacing lengths. In some such embodiments, the or each spacer component includes two or more arms. In various such embodiments, the two or more arms are substantially parallel with each other. In such embodiments, the rails on each arm may depend from a same facing side of each arm. In other such embodiments, the or each spacer component includes a base, wherein the or each arm depends substantially perpendicular from the base. In further such embodiments, each rail has a substantially L-shape cross-section. In such embodiments, each extent of the L-shape cross-section may be of substantially equal width. In yet other such embodiments, each rail has a "thick-to-thin" L-shape cross-section, wherein a first part of the rail (a first extent of the rail) depending from its respective arm has a substantially rectangular cross-sectional shape, and wherein a second part of the rail (a second extent of the rail) depending from the first part of the rail and substantially orthogonal with respect to the first part of the rail has a substantially trapezoidal cross-sectional shape. In some such embodiments, the trapezoidal cross-sectional shape of the second part of the rail is oriented such that the wider part of the trapezoidal shape depends from the first part of the rail, and the narrower part of the trapezoidal shape projects away from the first part of the rail. In some other such embodiments, the or each arm is substantially planar. In such embodiments, the rails of the arm extend along a side of the arm. In such embodiments, the rails on the or each arm may be offset from each other to form a gap between adjacent rails, such that, when the spacer component is operated with another like spacer component, the rails of one spacer component are accommodated snugly between the rails of the other spacer component. In other embodiments, the base includes a channel adjacent the or each arm and at a side of the or each arm from which the rails depend, the channel shaped, such that, when the spacer component is operated with another like spacer component, the channel snugly accommodates at least a part of a rail from the other spacer component being distal most from the base of the other spacer component. In various embodiments, the base, on an opposite side from which the or each arm depends, is configured for connecting the spacer component to an object. As such, when connected to the object and when operated with another like spacer component connected to another object, the objects can be spaced apart from each other at one length selected from the two or more selectable spacing lengths. In some embodiments, the configuration for connecting includes a clamp. In other such embodiments, the configuration for connecting includes a threaded joiner operable with apertures through which a part of each threaded joiner can protrude to be threadedly secured. In some embodiments, the or each arm includes seven (7) rails. In other embodiments, one spacer component has a first number of rails on the or each arm, and is operable with another spacer component having a second number of rails on each arm different from the first number of rails. In yet other embodiments, the spacer component, the adjustable spacer, the spacer system and methods for operating same include means for retaining spacer components together when slidably engaged with each other. In one such embodiment, the means for retaining includes one or more grub screws. In one example embodiment, each grub screw may be fastened through a threaded aperture in the arm of one spacer component to frictionally engage with a part of a rail of the other spacer component. In another such embodiment, the spacer components can be adhered together. In an example implementation, adhesive can be applied to rails on the arms of one or both spacer components, the spacer components can be slidably engaged, and the adhesive allowed to set or cure to join the spacer components together.

It will be appreciated that, where object connector and vehicle connector do not align with each other, it would be difficult if not impossible to mount such an object to such a vehicle. By use of the mounting apparatus in accordance with the present invention, such an object can be mounted on such a vehicle with suitable adjustment of two or more of the first mechanism, the second mechanism and the third mechanism.

In various embodiments, the lower surface (or bottom surface) of the object is substantially planar. Such a surface will not readily fit to a chassis which presents as non-planar (or irregularly-shaped). Accordingly, the mounting apparatus acts as an intermediary device to match the planar surface with the non-planar surface, by adjustment of any two or more of a first mechanism, a second mechanism, and a third mechanism.

In other embodiments, the two or more rails of the first mechanism are connected to the two or more rails of the second mechanism by slidable brackets. In alternative embodiments, the slidable brackets comprise the second mechanism, and the slidable brackets slide along a left-right axis on rails, wherein the rails are fitted to the third mechanism. In other such embodiments, the third mechanism includes the rails on which the slidable brackets are able to slide along a left-right axis with respect to the vehicle.

In some embodiments, each slidable bracket includes a first face which abuts a side of a rail of the first mechanism and is slidable along the first mechanism rail, and further includes a second face which abuts a top of a rail of the second mechanism and is slidable along the second mechanism rail. In yet other embodiments, each slidable bracket operates with fasteners which allow the bracket to be releasably retained in a position along the first mechanism rail, and which operate to allow the bracket to be releasably retained in a position along the second mechanism rail. In further embodiments, the first face and second face are orthogonal with respect to each other. In yet other embodiments, each rail includes at least one channel and each bracket operates with at least one guide which protrudes into a channel of a rail of the first mechanism, and at least one guide which protrudes into a channel of a rail of the second mechanism. In further embodiments, the fasteners comprise the guides. In some embodiments, each rail includes two channels and each bracket operates with eight fasteners, such that there are two fasteners comprising two fastening guides in each channel.

In embodiments, the rails of the first mechanism and the rails of the second mechanism have a same cross-sectional profile. In other embodiments, the rails of the first mechanism and the rails of the second mechanism have a different cross-sectional profile.

In various embodiments, the first mechanism comprises a top layer, the second mechanism comprises a middle layer and the third mechanism comprises a lower layer of the mounting apparatus.

In some embodiments, the mounting apparatus includes the first mechanism and second mechanism. In other embodiments, the mounting apparatus includes the first mechanism and the third mechanism. In yet other embodiments, the mounting apparatus includes the second mechanism and the third mechanism. In further embodiments, the mounting apparatus includes all three of the first mechanism, the second mechanism, and the third mechanism.

In embodiments, the first mechanism is adapted to connect to an underside of a tray deck by sliding connectors. In such embodiments, the tray deck is provided with channels with elongate axes in a left-to-right direction with respect to the utility vehicle on which the tray deck is to be mounted. In some such embodiments, the first mechanism includes the sliding connectors on a top surface thereof. In other such embodiments, the sliding connectors may be separate items, to be fitted after the first mechanism is placed against the underside of the tray deck. In further such embodiments, the sliding connectors, when initially fitted, attach the first mechanism to the underside of the tray deck, but are sufficiently loose so that the first mechanism is able to be adjusted in a direction substantially parallel with respect to the left-right axis of the vehicle, and, when the first mechanism is in a desired position, the sliding connectors can be tightened or otherwise operated to retain the first mechanism in the desired position.

In an example usage of the mounting apparatus in various embodiments, the mounting apparatus is assembled by first connecting the first mechanism to the underside of a tray deck using the sliding connectors, wherein the first mechanism is able to slide laterally with respect to the tray deck. In a next step, if the third mechanism is required for adjusting the mounting apparatus in a direction substantially parallel with respect to the vertical axis of the vehicle, the third mechanism is attached to the chassis of the vehicle at one or more locations forming the connector on the vehicle chassis. The third mechanism is adjusted in height so that the second mechanism, when attached to the top part of the third mechanism has a notional plane substantially parallel with the plane of the tray deck. In example applications with embodiments of the mounting apparatus, the third mechanism may include a number of discrete locations where the height of each location can be adjusted independently of the height of others of the locations. In some such embodiments, the discrete locations comprise a number of columns, or substantially columnar height-adjustable structures. The third mechanism may also include one or more rails with a longitudinal axis in a right-left direction with respect to the vehicle. In a next step of example assembly, the second mechanism (an embodiment wherein the second mechanism comprises the slidable brackets) is slidably attached to the third mechanism, and the second mechanism is adjusted to align with the first mechanism, and such that the angled brackets can be connected with the first mechanism.

BRIEF DESCRIPTION OF THE DRAWINGS

At least one embodiment of the invention will be described with reference to the following, non-limiting illustrations representing the at least one embodiment of the present invention, in which:

FIG. 15 is a top plan view of that shown in FIG. 9, in accordance with an embodiment of the present invention;

DETAILED DESCRIPTION OF SOME EMBODIMENTS

Figure 1:
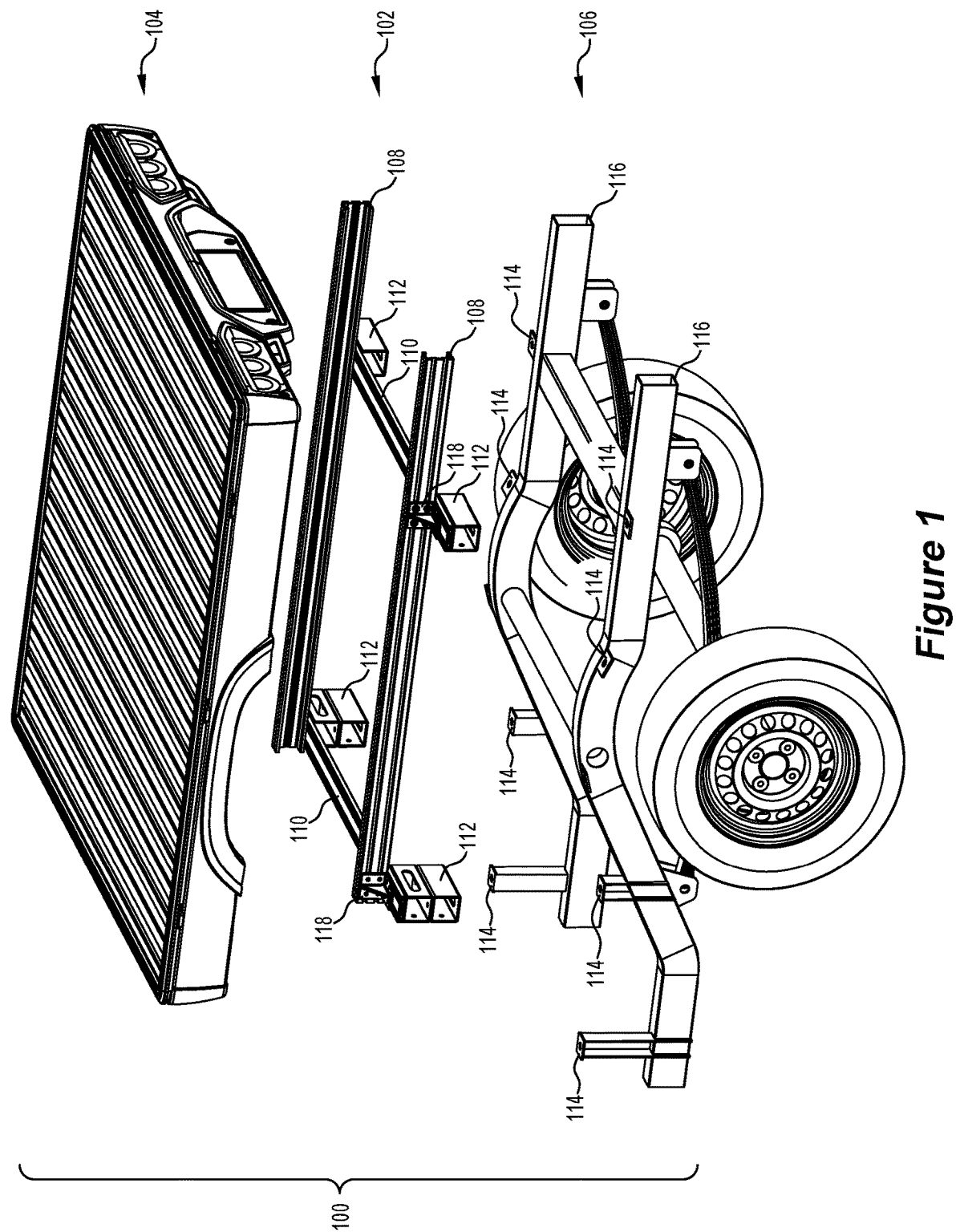
FIG. 1 is a rear perspective exploded view of a deck, a utility vehicle rear chassis, and mounting apparatus, in accordance with an embodiment of the present invention.

FIG. 1 shows an assembly 100 of mounting apparatus 102, a utility tray 104, and a utility vehicle chassis 106 (being the rear part of the vehicle chassis). The mounting apparatus includes a first mechanism 108 adjustable in a direction substantially parallel with respect to the left-right axis of the vehicle. The first mechanism includes two parallel rails which are configured to slide parallel to the left-right axis of the vehicle. The mounting apparatus also includes a second mechanism 110 adjustable in a direction substantially parallel with respect to the front-to-rear (or longitudinal) axis of the vehicle. The second mechanism includes two parallel rails which are configured to slide parallel to the front-to-rear (or longitudinal) axis of the vehicle. In this embodiment, the rails of the first mechanism and the rails of the second mechanism are connected with each other via four angled brackets 118 (only two of the brackets shown in FIG. 1) to form a substantially rectangularly shaped adjustable frame. The brackets are configured to allow the rails of the first and second mechanism to slide with respect to each other, such that the rails of the first mechanism slide in a direction orthogonal to the direction in which the rails of the second mechanism are allowed to slide.

The mounting apparatus further includes a third mechanism 112 adjustable in a direction substantially parallel with respect to the vertical axis of the vehicle. The third mechanism includes inserts (in this embodiment, sections of square cross-sectional tubing), which can be stacked to increase the height of the third mechanism as desired. As can be seen in FIG. 1, the two columns of inserts of the third mechanism towards the front of the mounting apparatus each include two sections of tubing, and the two columns of inserts of the third mechanism towards the rear of the mounting apparatus each include one section of tubing, so as to allow connection with vehicle connector 114 which are lower towards the front of the chassis frame 116 than towards the rear of the chassis frame.

It will also be appreciated that the first mechanism 108 and second mechanism 110 can be slid such that the columns of the third mechanism align with the vehicle connector 114.

The chassis has a frame 116 and a number of vehicle connectors 114 attached to the chassis frame. As can be seen in FIG. 1, the vehicle connectors include a mix of protruding tabs with holes and vertically protruding columns seen towards the front of the depicted part of the chassis 106. The vehicle connectors are formed in pairs on either side of the frame 116, and, due to the curvature of the frame and the varying heights of the columns for the front-most vehicle connector, the pairs of vehicle connectors are situated at different heights. It will be appreciated that the utility tray 104 has a substantially planar surface.

Figure 2:
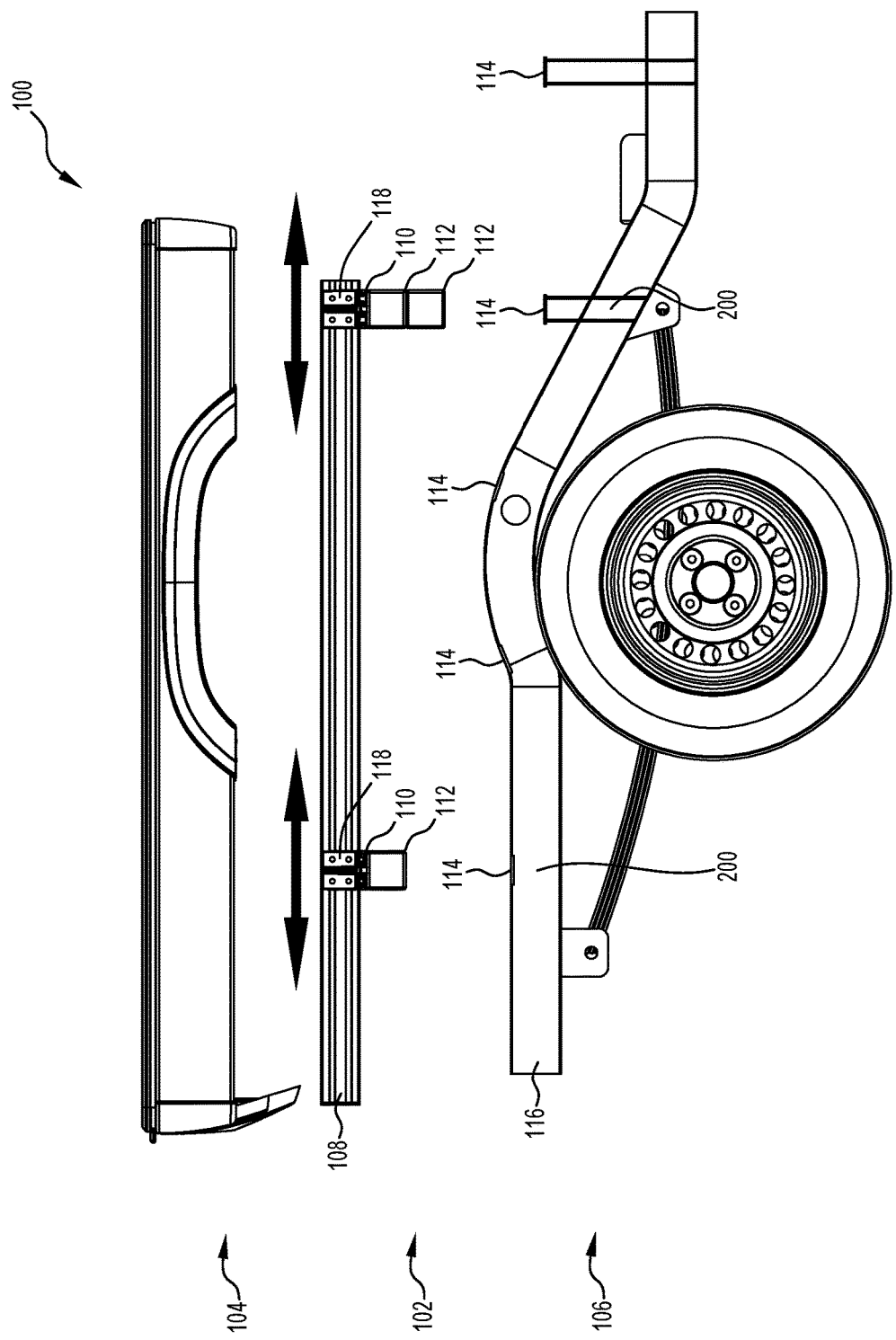
FIG. 2 is a side elevation exploded view of that shown in FIG. 1, in accordance with an embodiment of the present invention.

FIG. 2 shows a different view from FIG. 1, with the front of the vehicle chassis towards the right of the Figure and the rear of the vehicle chassis towards the left of the Figure.

The front column pairs of the vehicle connectors 114 have different lengths, and the tops of the pairs are at slightly different heights from each other. Further, the vehicle connectors comprising protruding tabs at the center and toward the rear of the chassis are at different heights from the front column pairs. It will be appreciated that the depicted embodiment of the mounting apparatus allows for vertical, lateral and longitudinal adjustment such that the bottoms of the third mechanism (the bottom of each of the four columns comprising this embodiment of the third mechanism) are able to align with the corresponding vehicle connectors.

The arrows depicted in FIG. 2 show the longitudinal movement (front-to-rear axis movement) of the second mechanism 110, wherein the rails of the second mechanism are able to slide longitudinally with respect to the rails of the first means 108. In an example method, a user may operate the brackets 118 to slidably release from the rails of the first mechanism, such that the user can longitudinally slide the second mechanism to a desired position (so as to locate both the front and rear column pairs of the third mechanism to be in alignment with the chosen vehicle connection means 200), whereupon the user can then releasably secure the brackets at the chosen position.

It will be appreciated that, in this embodiment, the object to be connected, the tray 104, has a substantially planar bottom surface, and the mounting apparatus 102 presents a substantially planar top surface (the parallel rails of the first mechanism 108 comprising the "planar" top surface), such that the tray is able to be readily seated on the mounting apparatus, and can be fixed to same with clips, a threaded securing arrangement (such as nuts and bolts), or any other suitable means for securing the tray to the mounting apparatus.

Figure 3:
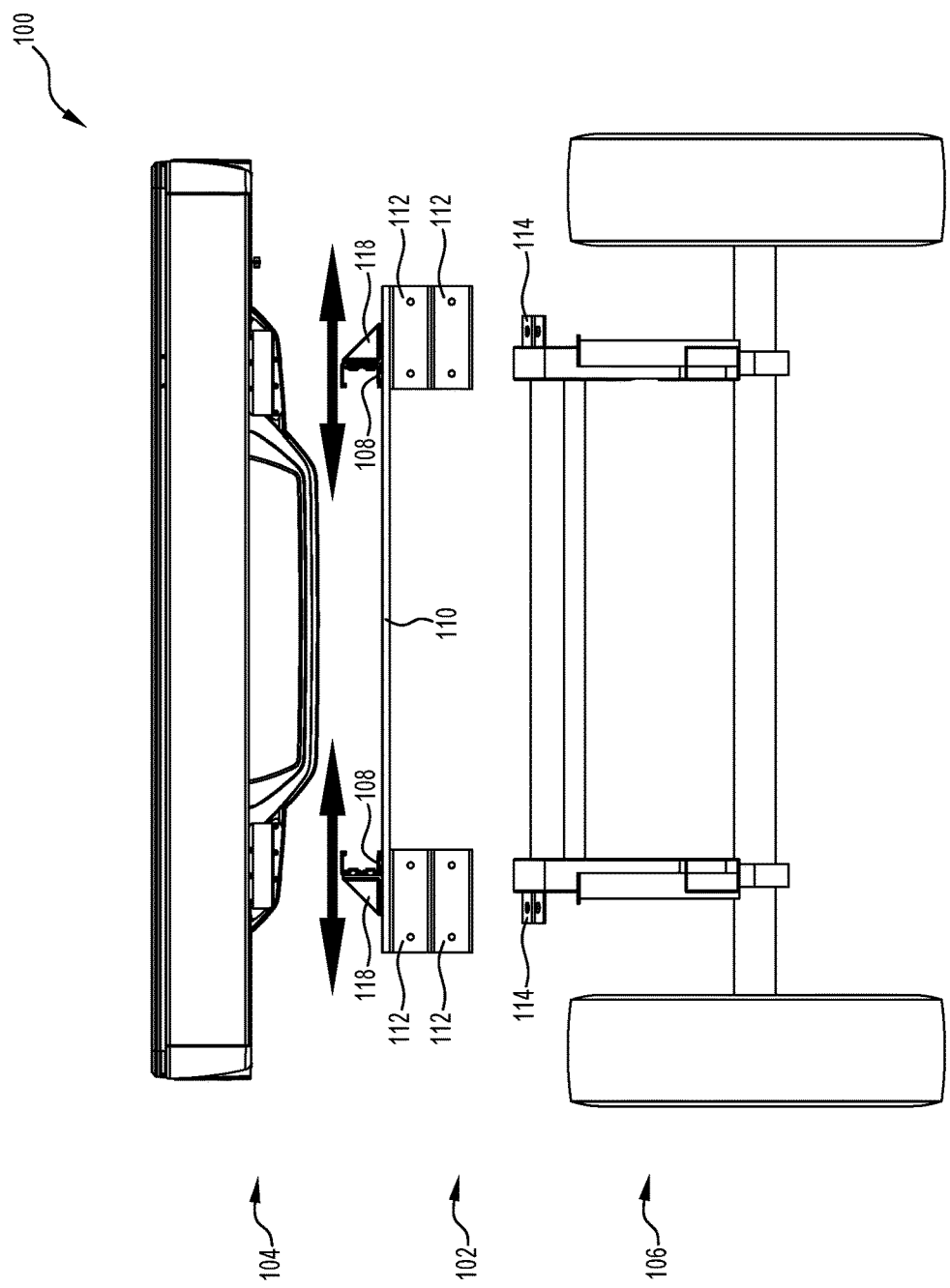
FIG. 3 is a rear elevation exploded view of that shown in FIGS. 1 and 2, in accordance with an embodiment of the present invention.

FIG. 3 depicts arrows indicating the rails of the first mechanism 108 are adjustable by sliding movement in a lateral direction (side-to-side or transverse movement) with respect to the vehicle 104. In an example method, a user may operate the brackets 118 to slidably release from the rails of the second mechanism 110, such that the user can laterally slide the first mechanism to a desired position (so as to locate left and right column pairs of the third mechanism 112 to be in alignment with the chosen vehicle connection means 200), whereupon the user can then releasably secure the brackets at the chosen position.

Figure 4:
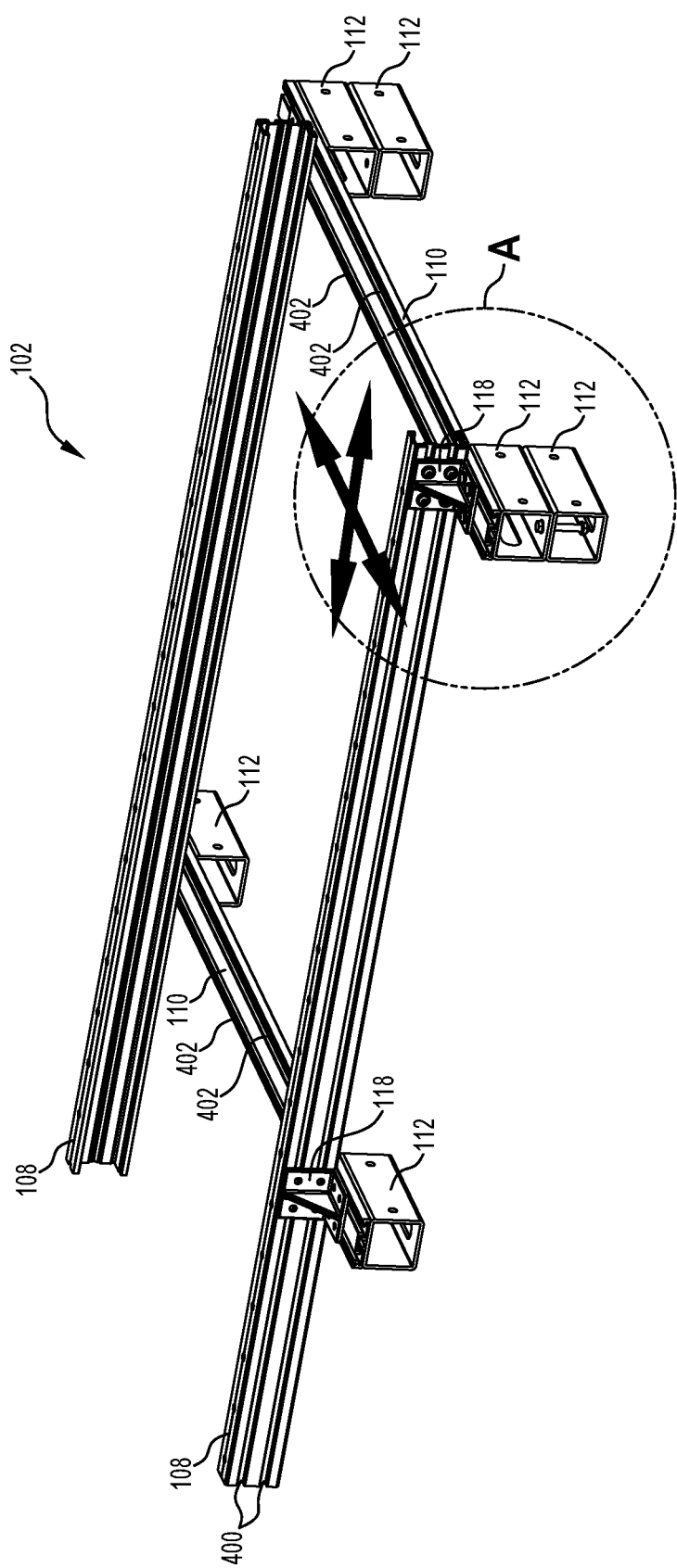
FIG. 4 is a rear perspective view of mounting apparatus, in accordance with an embodiment of the present invention.

As depicted in FIG. 4, with arrows shown in both lateral and longitudinal directions, the brackets can be slidably released from the rails of both the first 108 and second 110 means to allow a user to suitably adjust all the rails of the mounting apparatus 102 in both a lateral and longitudinal direction, and so as to align the four columns of the third mechanism 112 with the chosen vehicle connector 200.

Also shown in FIG. 4 are channel pairs 400 in each of the rails of the first mechanism 108, and channel pairs 402 in each of the rails of the second mechanism 110. The brackets may include protrusions for engaging with the channels so as to form a directional guide for the brackets when sliding along the respective rails.

Figure 5:
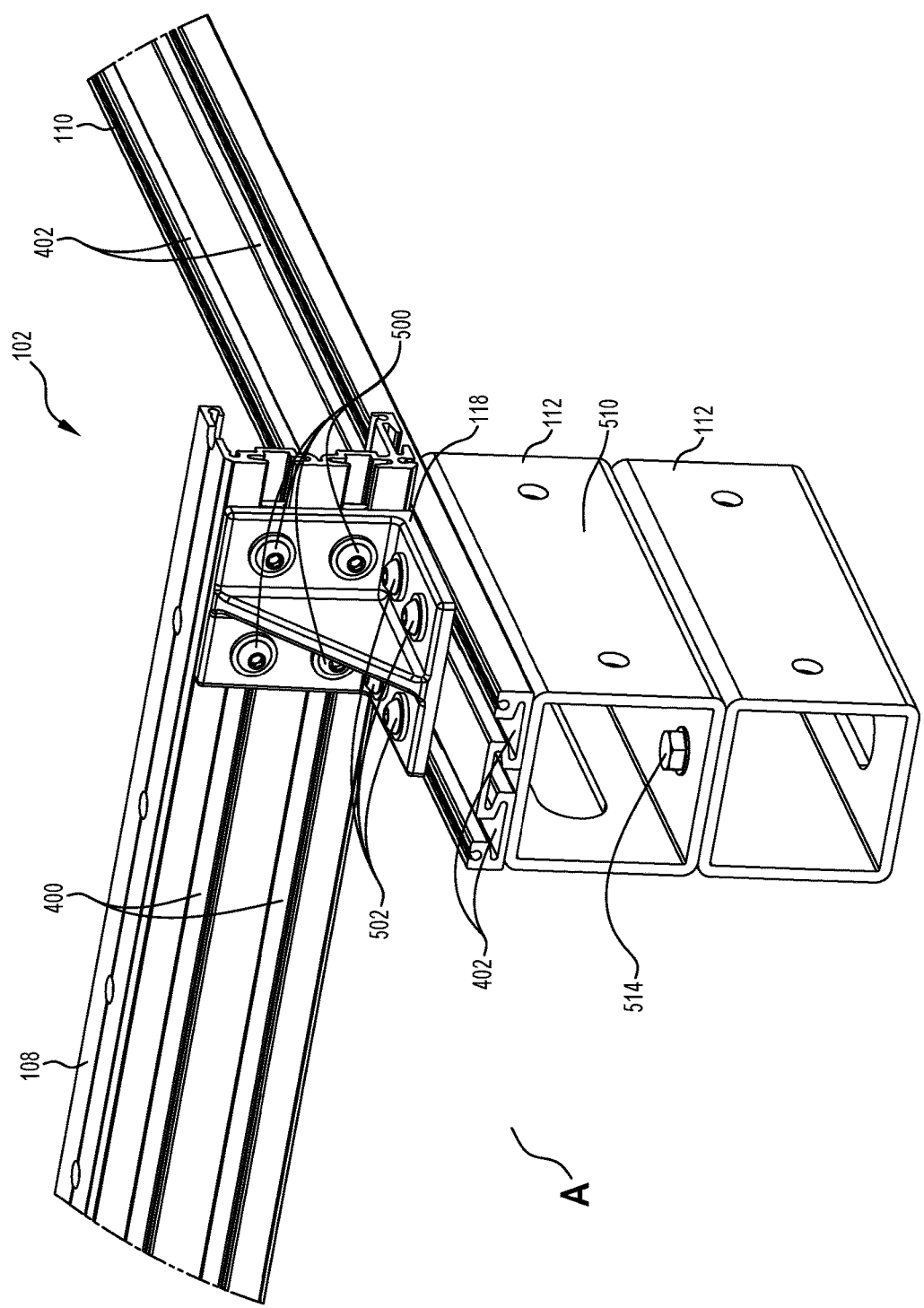
FIG. 5 is a detail showing a corner of the mounting apparatus from FIG. 4, in accordance with an embodiment of the present invention.

FIG. 5 is a detail A from FIG. 4, and shows the brackets 118, including a total of eight fasteners for the depicted bracket, wherein four fasteners 500 operate to engage the bracket with channel pairs 400 in the rail of first mechanism 108, and four fasteners 502 operate to engage the bracket with channel pairs 402 in the rail of second mechanism 110.

Also depicted in more detail in FIG. 5, the third mechanism 112, in this example, includes two inserts in a vertical arrangement, comprising two square cross-sectional tubular sections 510 (upper) and 512 (lower) secured together by a threaded connector 514 (nut and bolt). It will be appreciated that the tubular sections (or inserts) can have a range of selectable sizes so that the length of the columns formed for the third mechanism can be adjusted to required accuracy.

In other embodiments, the third mechanism may include one or more substantially square-"C"-shaped cross-sectional sections. In this regard, the sections would be similar to the square cross-sectional tubular sections depicted in FIG. 5, but with one side partly or wholly missing.

Figure 6:
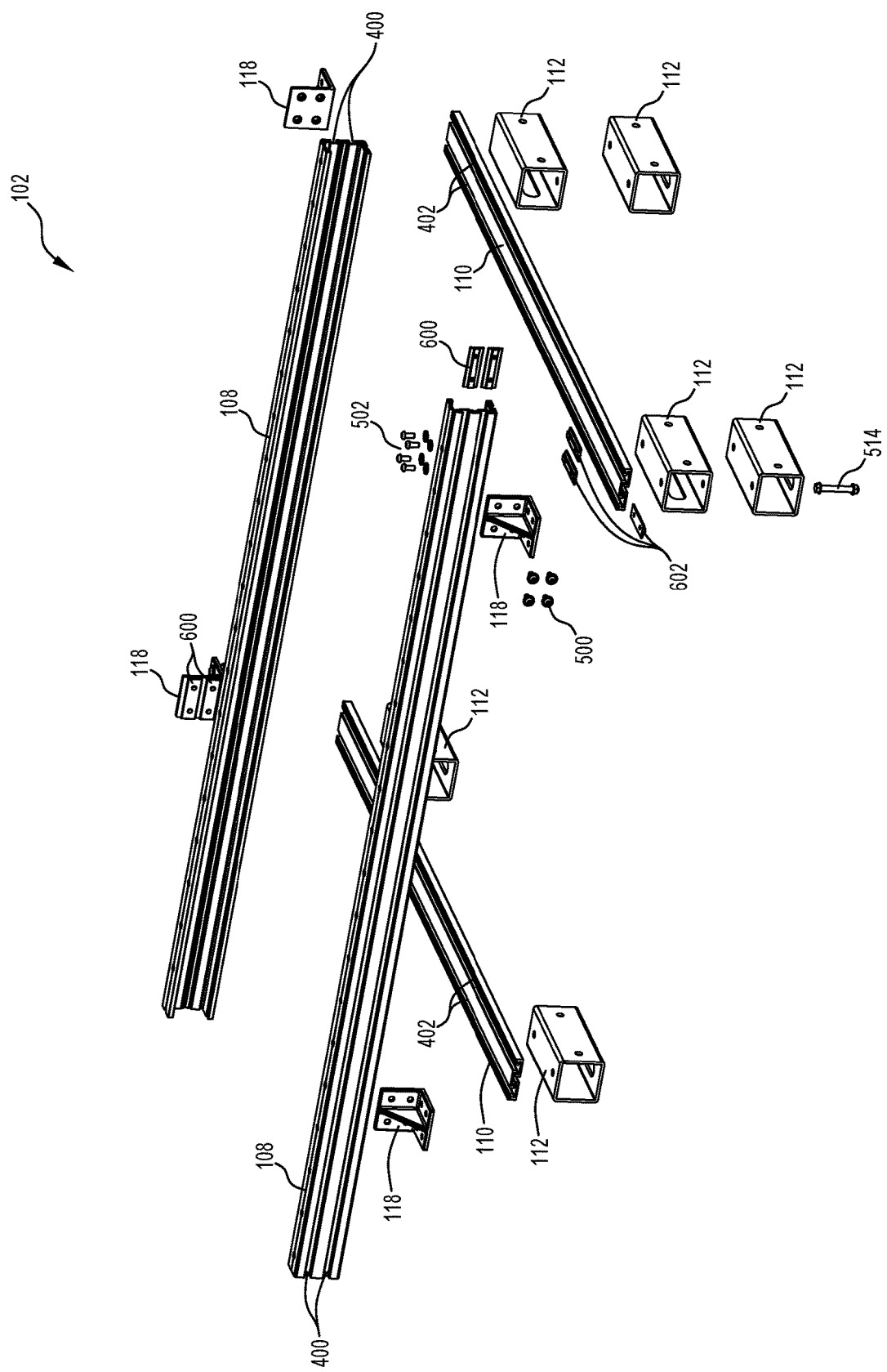
FIG. 6 is a rear perspective exploded view of that shown in FIG. 4, in accordance with an embodiment of the present invention.

FIG. 6 further depicts plates 600 which operate with fasteners 500 to releasably engage a bracket 118 with a rail of the first mechanism 108. Further shown are plates 602 which operate with fasteners 502 to releasably engage a bracket 118 with a rail of the second mechanism 108. The plates assist in providing a mechanism for the sliding movement of the bracket with respect to a corresponding rail. The two plates 600 are located in respective channels in the rail of the first mechanism 108, and the three plates 602 are located in respective channels in the rail of the second mechanism 110 (as depicted in this embodiment, with three channels, two on one side and one on the opposite side of the rail).

Figure 7:
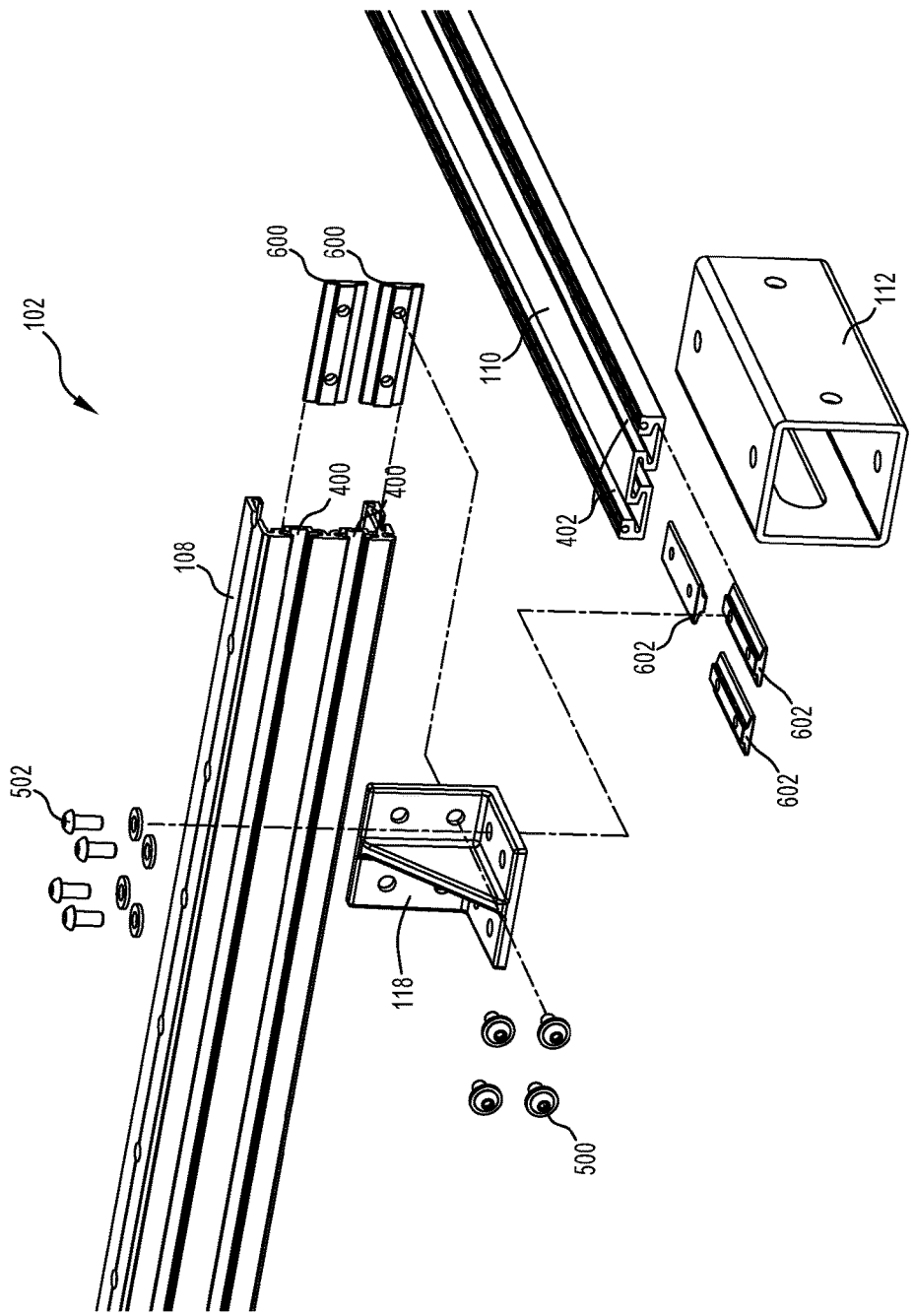
FIG. 7 is a detail showing a corner of the mounting apparatus from FIG. 6, in accordance with an embodiment of the present invention.

FIG. 7 shows clearer depictions of details from FIG. 6, with dashed and dotted lines showing the alignment of the fasteners with plates and channels to form a releasably engaging and slidable mechanism for the bracket with the rails.

Figure 8:
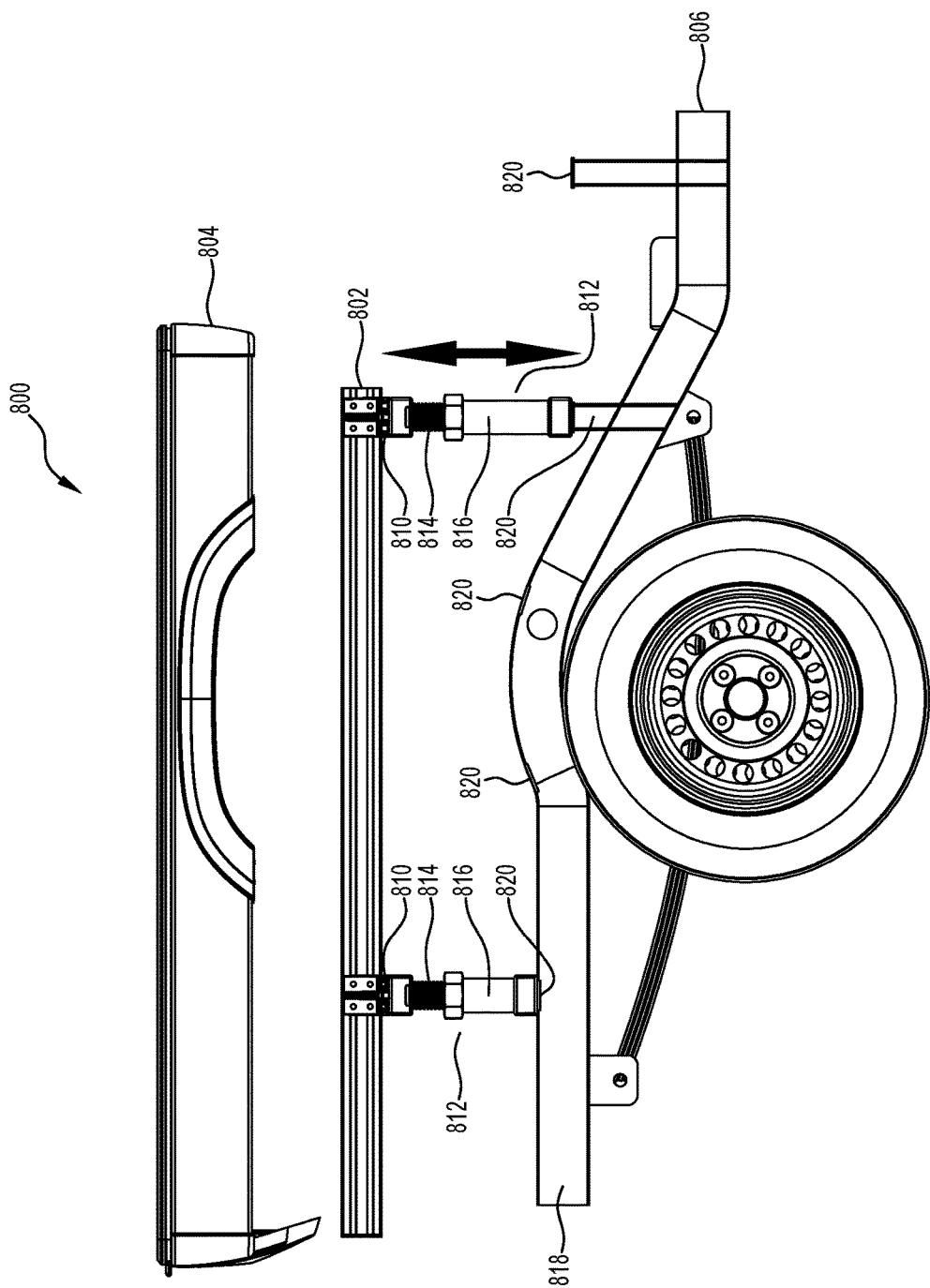
FIG. 8 is a side elevation exploded view of a deck, a utility vehicle rear chassis, and an alternative embodiment of the mounting apparatus, in accordance with an embodiment of the present invention.

FIG. 8 depicts an alternative embodiment 800 of the present invention, with a tray 804 mounting onto a mounting apparatus 802, which, in turn, mounts onto a chassis 806. The chassis includes a frame 818 and vehicle connectors 820. The mounting apparatus 802 includes a first mechanism 808, a second mechanism 810, with the third mechanism 812 including four threaded arrangements for adjusting column lengths of the third mechanism. Each threaded arrangement includes an externally threaded section 814, and a section 816 with an internally threaded part, wherein by operation of the threaded means to adjust the length of the columns, the desired vertical alignment with the chosen vehicle connector 820 can be achieved.

In some embodiments, the third mechanism 112 may include more than four columns. In other embodiments, the third mechanism may include a mixture of inserts and threaded adjustment means.

Figure 9:
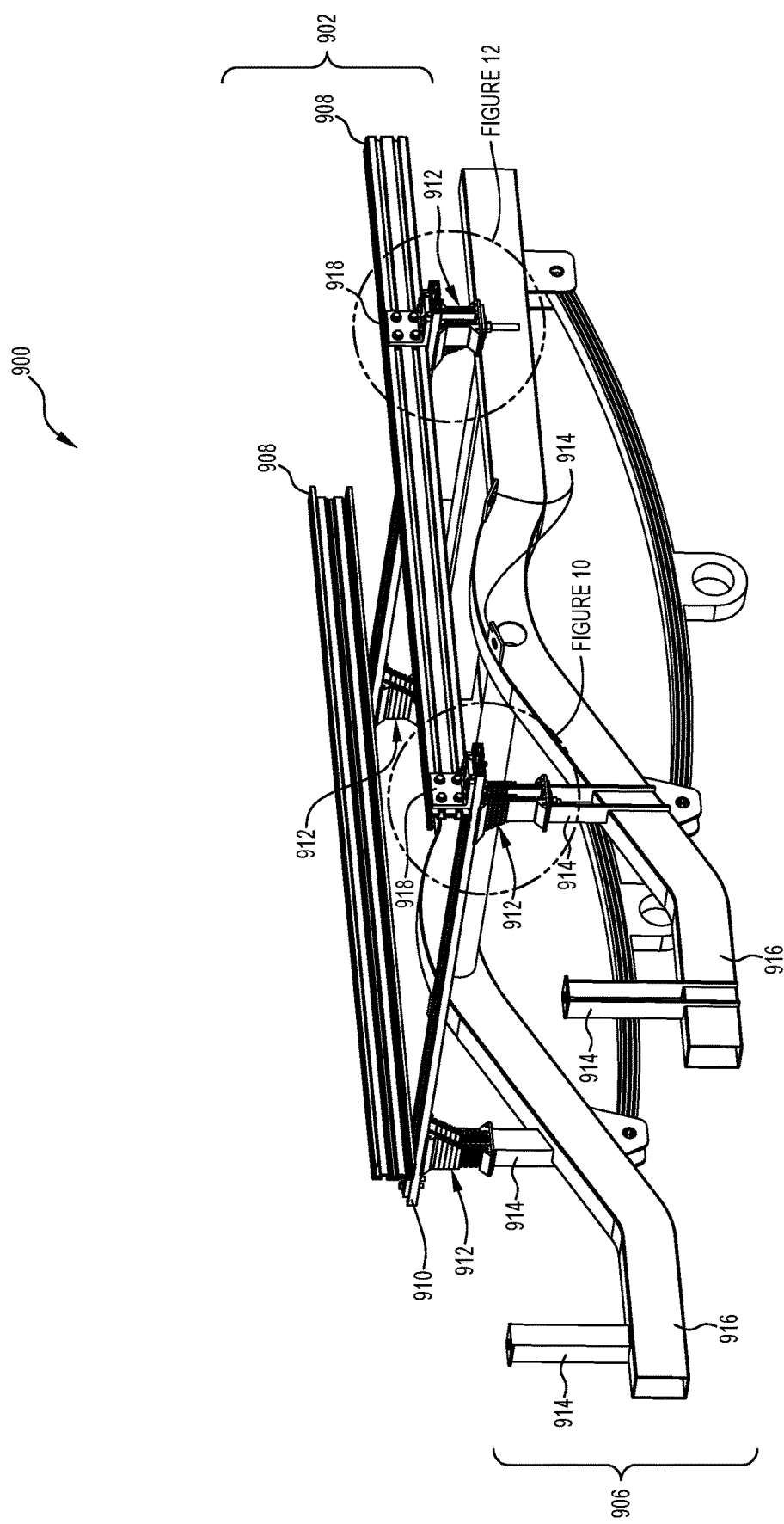
FIG. 9 is a perspective view of a mounting apparatus, in accordance with yet another embodiment of the invention.

FIG. 9 depicts an alternative embodiment 900 of the present invention showing a mounting apparatus 902, which, in turn, mounts onto a chassis 906. The chassis includes a frame 916 and a plurality of vehicle connectors 914. The mounting apparatus 902 includes a first mechanism 908, a second mechanism 910, the first and second mechanism connected by slidable brackets 918, and the third mechanism 912 including four adjustable spacers for adjusting column lengths of the third mechanism. The direction of adjustment of the adjustable spacers shown by arrow "X".

Figure 10:
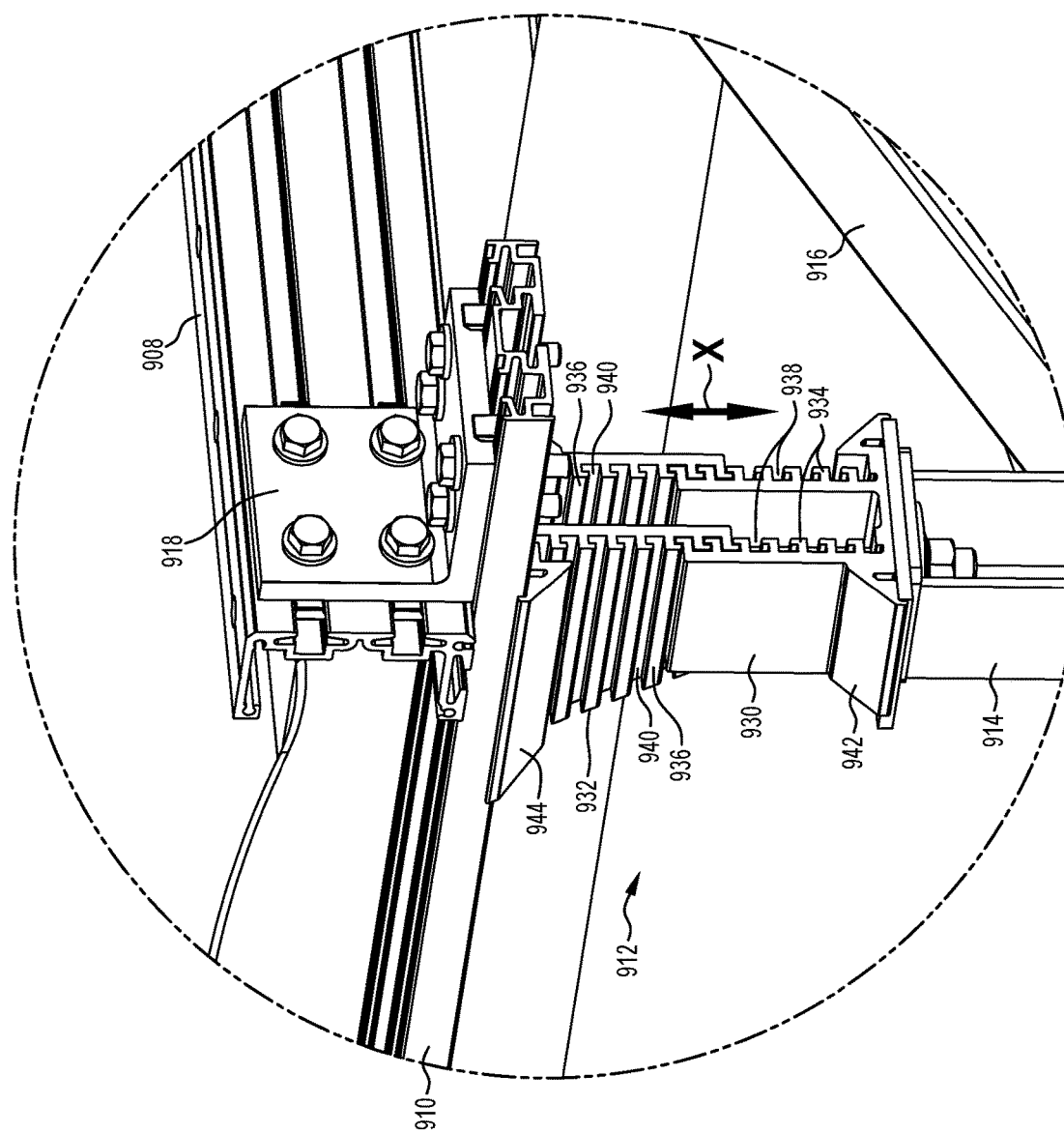
FIG. 10 is a detail view of a part of FIG. 9 indicated in a long and short dashed line circle, in accordance with an embodiment of the present invention.

A shown in FIG. 10, each adjustable spacer 912 includes a first spacer component 930 (the bottom spacer component, as shown in FIG. 10), and a second spacer component 932 (the top spacer component, as shown in FIG. 10). The first spacer component 930 has a plurality of rails 934 mounted on two arms depending from a base 942, each rail having an L-shape cross-section, and the rails offset equally from each other to form L-shape cross-section spaces 938 therebetween. The base 942 is secured to the vehicle connector 914 by a bolt. Similarly, the second spacer component 932 has a plurality of rails 936 mounted on two arms depending from a base 944, each rail having an L-shape cross-section, and the rails offset equally from each other to form L-shape cross-section spaces 940 therebetween. The base 944 is secured to the second mechanism 910 by a bolt which slides into a bottom slot in the second mechanism 910. The rails of the first spacer component are configured to slidably engage with spaces of the second spacer component, and the rails of the second spacer component are configured to slidably engage with spaces of the first spacer component.

As shown in FIG. 10, the front-most adjustable spacer is adjusted to have a first length wherein only the first two rails of each of the first and second components engage into respective spaces. This results in the adjustable spacer having a relatively long spaced configuration.

Figure 11:
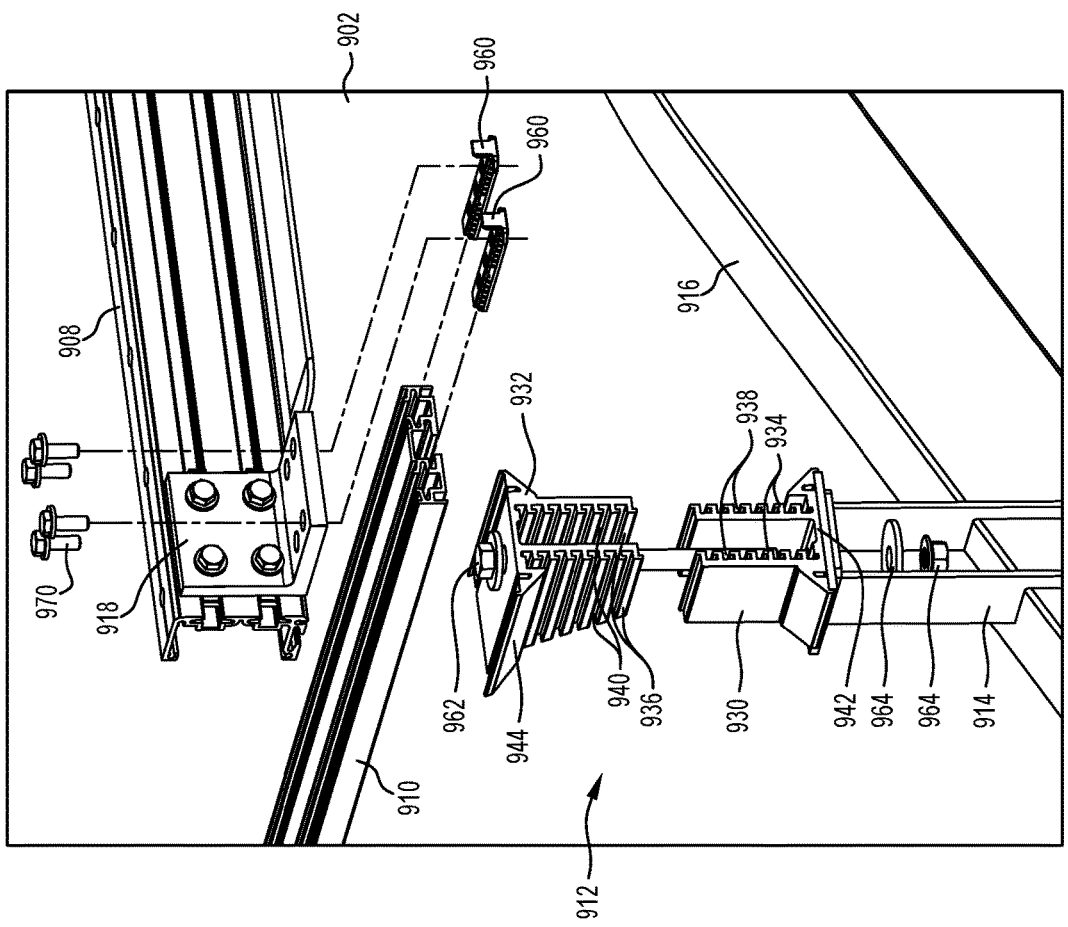
FIG. 11 is an exploded view of the components shown in FIG. 10, in accordance with an embodiment of the present invention.

FIG. 11 shows an exploded view of the components depicted in FIG. 10. Some components which can be more-clearly seen in FIG. 11 include slidable lugs 960, which slide into parallel top slots in the second means 910, and provide a location for threading bolts 970 for securing bracket 918 to the second means. Also shown is bolt 962 which threads into base 944 and slides into a bottom slot of second means 910. Bolt 962 also protrudes through the base 942 and through the vehicle connection means 914 to be secured by nut and washer 964.

Figure 12:
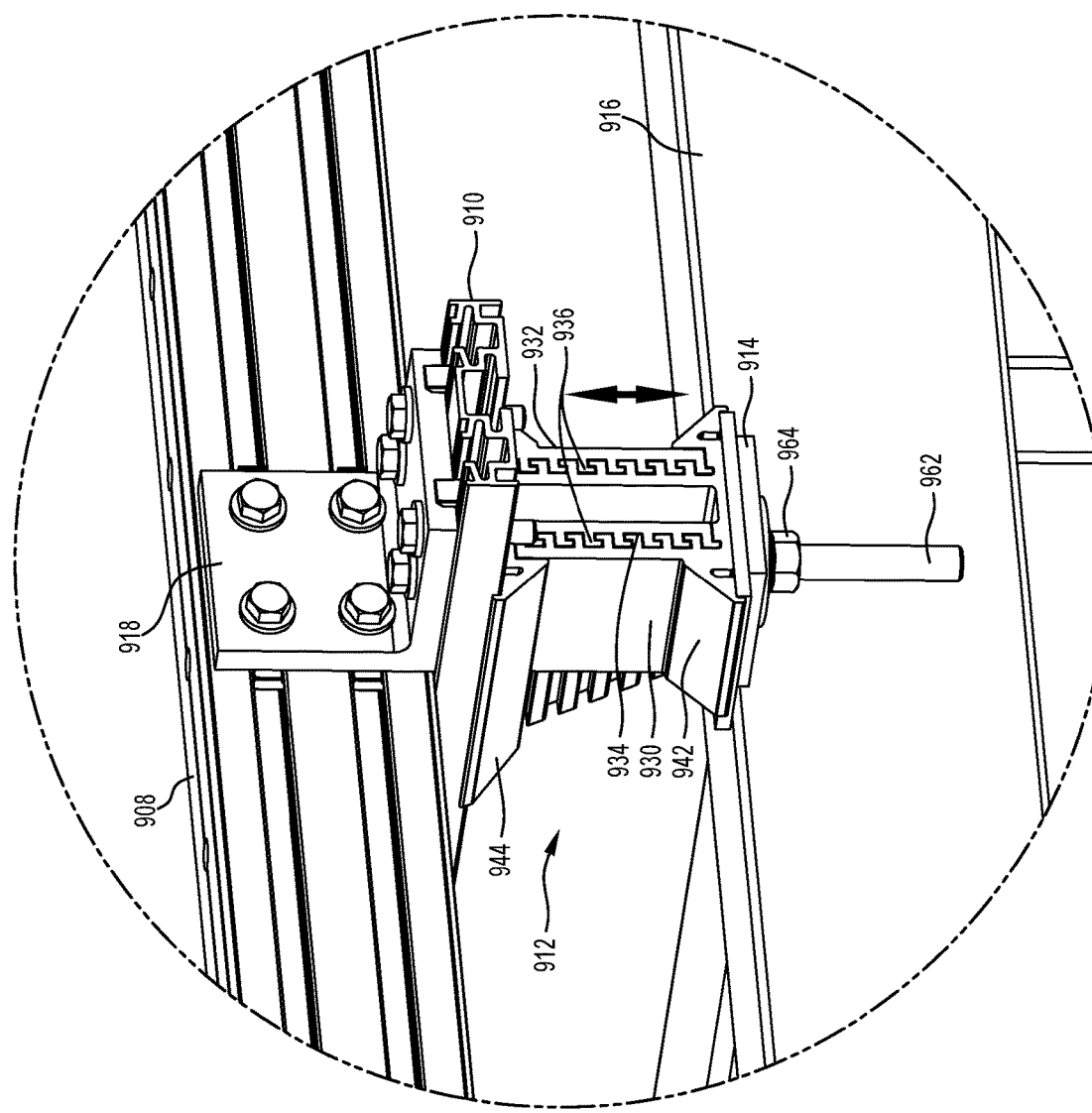
FIG. 12 is a detail view of a part of FIG. 9 indicated in a long and short dashed line circle, in accordance with an embodiment of the present invention.

FIG. 12 shows the adjustable spacer 912 towards the rear of the mounting apparatus 902 where the first spacer component 930 and second spacer component 932 are fully engaged with all rails 934 from the first spacer component engaged into all spaces 940 of the second spacer component and all the rails 936 of the second spacer component are engaged into all the spaces 938 of the first spacer component. This arrangement of the adjustable spacer results in a relatively short spaced configuration.

Figure 13:
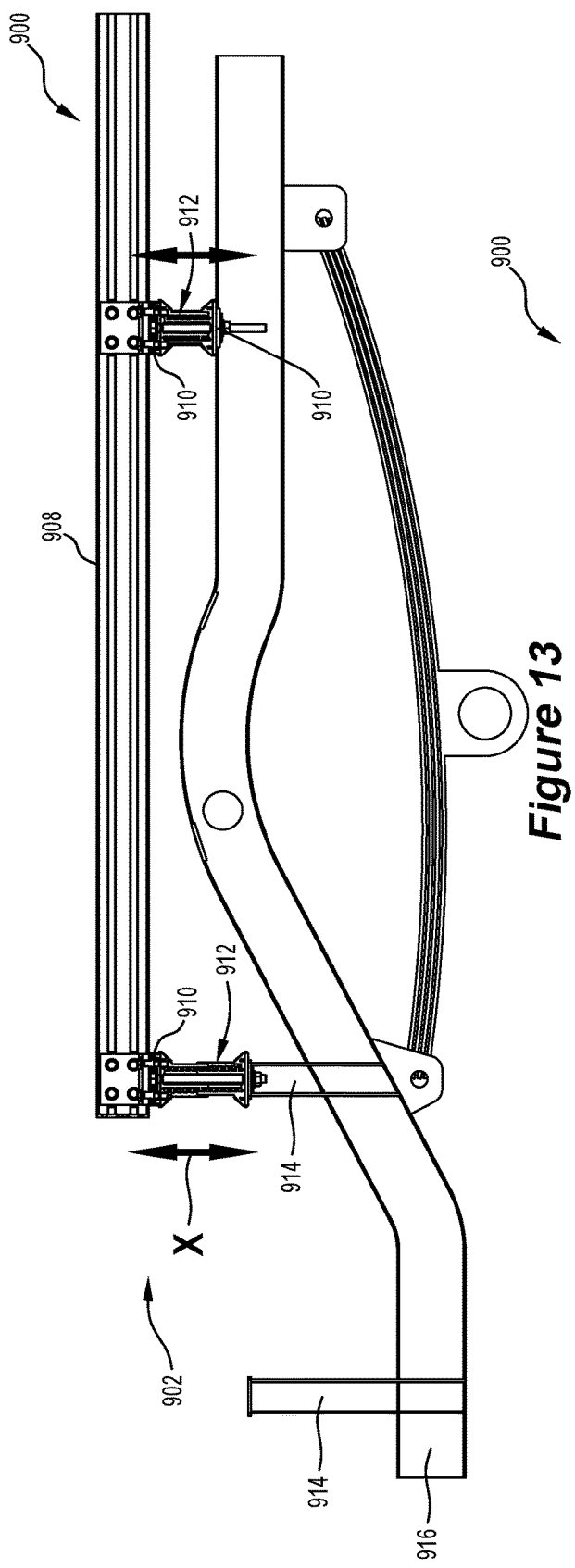
FIG. 13 is a side elevation view of that shown in FIG. 9, in accordance with an embodiment of the present invention.
Figure 14:
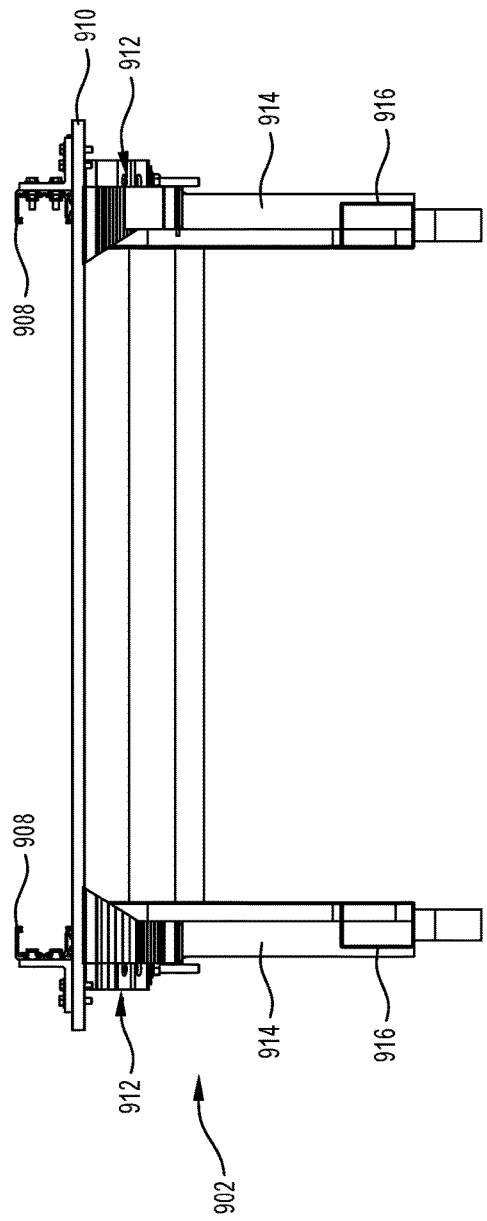
FIG. 14 is an end elevation view of that shown in FIG. 9, in accordance with an embodiment of the present invention.

FIG. 13 shows the differing spacing lengths of the front and rear adjustable spacers 912. FIGS. 14 and 15 show, respectively, end elevation view and top plan view of the mounting apparatus 902.

Figure 16:
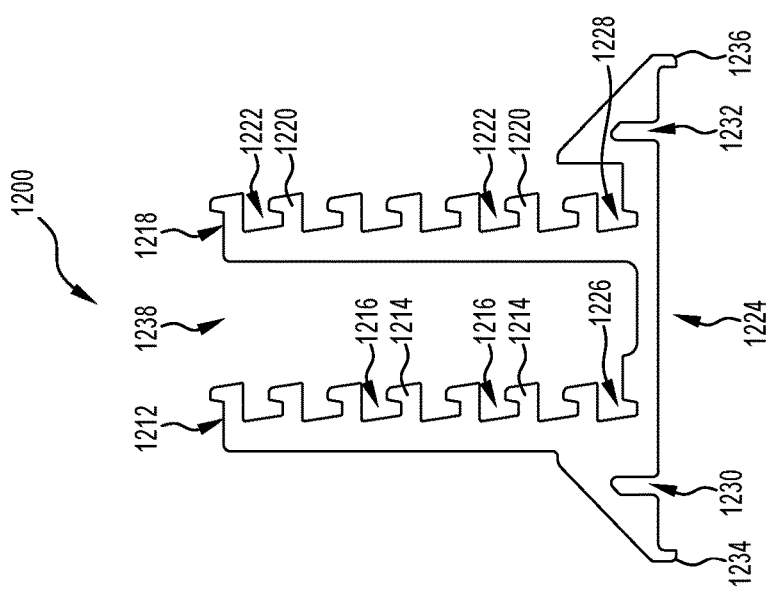
FIG. 16 is an end elevation view of a spacer component with rails and channels formed therebetween having a different cross-sectional shape from those depicted in previous Figures, in accordance with an embodiment of the present invention.

FIG. 16 shows a spacer component 1200 including two arms 1212 and 1218, each arm depending upwardly (as shown in FIG. 16) from a base 1224, and the arms being substantially planar parallel with each other. In other embodiments, a spacer component 1200 may have a single arm, or may have more than two arms. The arms 1212, 1218 are planar and have a substantially rectangular shape. The arms 1212, 1218 are separated to form a space 1238 therebetween.

Each arm 1212, 1218 of the spacer component 1200 has seven (7) rails, each rail depending from their respective arm. The rails 1214 depending from arm 1212 depend inwardly to space 1238, and the rails 1220 depending from arm 1218 depend outwardly from the spacer component 1200. The rails are substantially evenly offset from each other along their respective arm. The rails 1214, 1220 each have a "thick-to-thin" L-shaped cross-section with a first part of each rail depending from its respective arm having a substantially rectangular cross-sectional shape, and a second part of each rail depending from the first part of each rail having a substantially trapezoidal cross-sectional shape.

Between the lower-most to the upper-most rails 1214 (as depicted in FIG. 16) of arm 1212 are spaces 1216. Similarly, between the lower-most to the upper-most rails 1220 (as depicted in FIG. 16) of arm 1218 are spaces 1222. Each space 1216, 1222 can be seen to form a "thick-to-thin" L-shape cross-section channel into which rails of another like spacer component can be slid. In embodiments, the rails are shaped and offset from each other so as to provide a space therebetween which tightly or snugly accommodates rails of another like spacer component.

Figure 19:
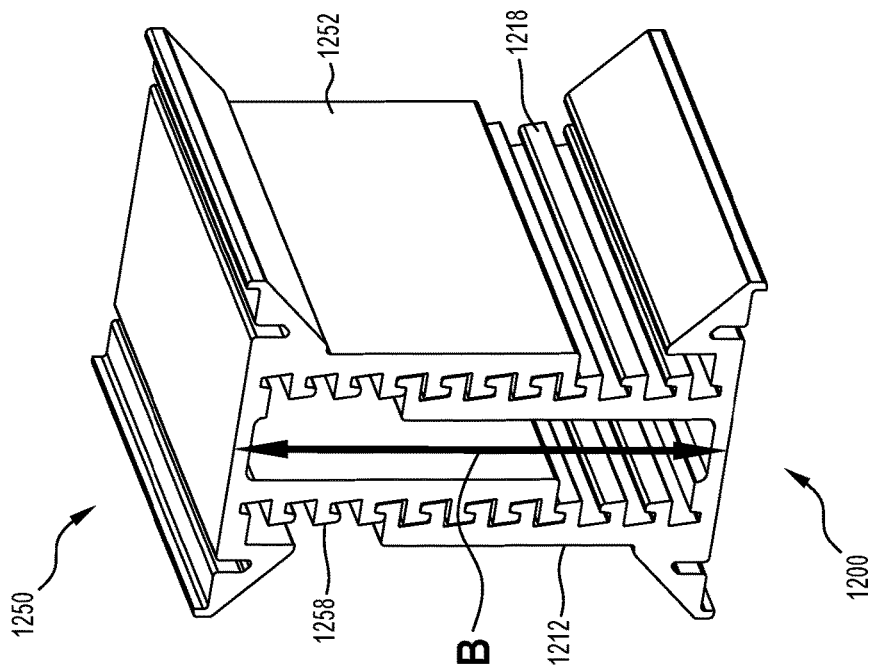
Figure 18:
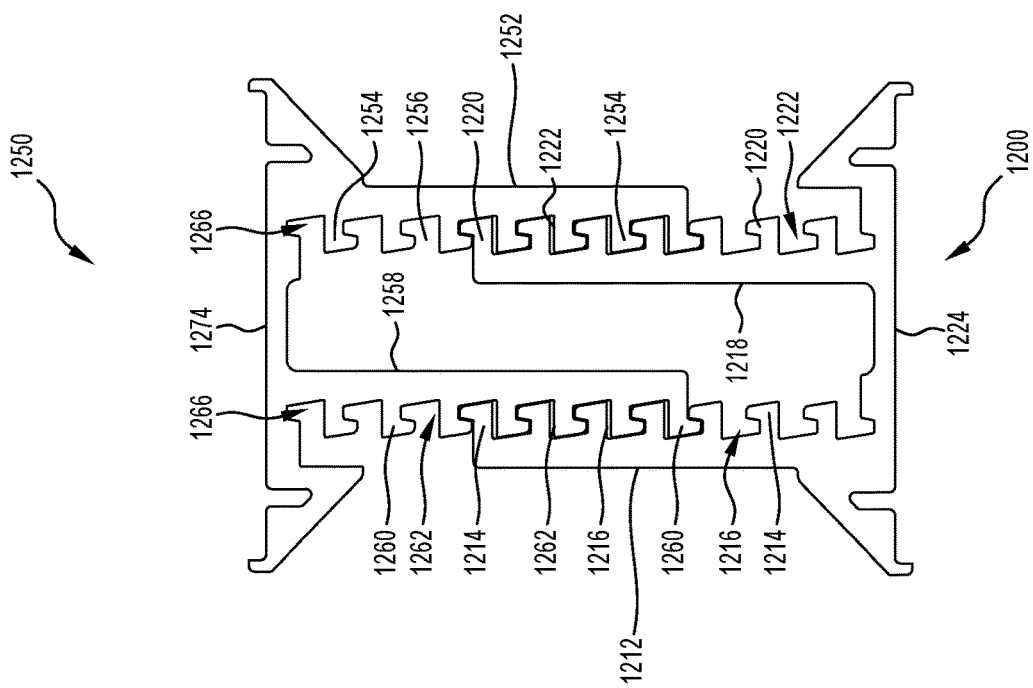
FIG. 18 is an end elevation view of two spacer components slidably engaged with each other to form a spacer having a first selected spacing length, in accordance with an embodiment of the present invention; and, FIG. 19 is a perspective view of the spacer component shown in FIG. 18, in accordance with an embodiment of the present invention.

The "thick-to-thin" L-shape cross-section of the rails 1214, 1220 of spacer component 1200, with the second part of each rail having a substantially trapezoidal cross-sectional shape, and the complementary spaces 1216, 1222 forming "thick-to-thin" L-shape cross-section channels, may provide an advantage with easier sliding when two like spacer components are joined together to form a spacer (as depicted in FIGS. 18 and 19). Further, the "thick-to-thin" L-shape cross-section of the rails 1214, 1220 and the complementary spaces 1216, 1222 forming "thick-to-thin" L-shape cross-section channels may provide an advantage in a firmer joining between spacer components forming a spacer. The substantially trapezoidal cross-sectional shape may also provide an advantage in being more resilient against snapping or distorting under a load when compared with other shapes, such as the "straight" L-shaped cross-sectioned rails depicted in previous Figures.

The spacer component 1200 includes channel 1226 in the base 1224, located adjacent arm 1212, on the side of the arm 1212 from which the rails 1214 depend. Similarly, channel 1228 is located adjacent arm 1218, on the side of the arm 218 from which the rails 1220 depend. There is a space formed between the proximal-most rail to the base 1224 on each arm 1212, 1218 and the channels 1226 and 1228. Each space formed between channel and rail has a "thick-to-thin" L-shape cross-section with the second part of each channel having a substantially trapezoidal cross-sectional shape. These spaces are configured to slidably accommodate rails on a like spacer component, which are distal-most on each respective arm from the base of the like spacer component. It will be appreciated by the skilled reader that the distal-most arms are slid into the respective channel spaces only when the selected spacing length of the spacer components operating together is the shortest spacing length, given the respective bases of each of the spacer components are closest together in such configuration.

The base 1224 of the spacer component 1200 has a flat area with railings 1234 and 1236 on each side thereof. The base also includes two channels 1230 and 1232. The channels 1230, 1232 provide the base with some flexibility for accommodating an object, and the railings may be configured to assist with clamping a suitably-shaped object.

Figure 17:
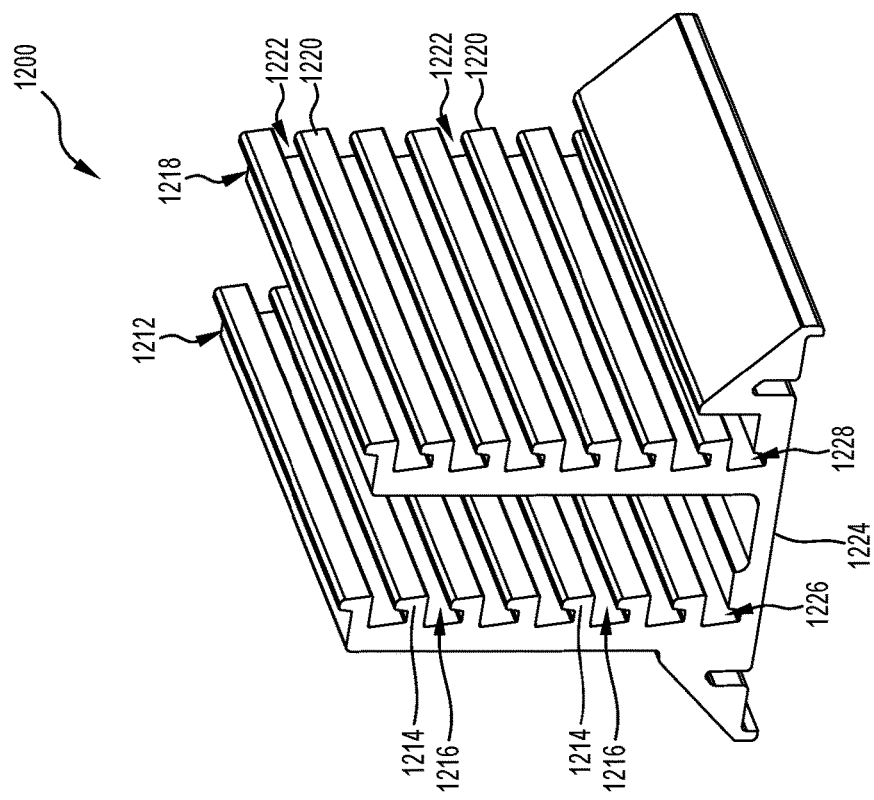
FIG. 17 is a perspective view of the spacer component shown in FIG. 16, in accordance with an embodiment of the present invention.

FIG. 17 shows another view of the spacer component 1200 shown in FIG. 16.

FIG. 18 shows the first spacer component 1200 and the second spacer component 1250 slidably engaged to form a spacer having a first selected spacing length "B" (refer to FIG. 19).

Spacer component 1250 (being like spacer component 1200) includes two arms 1252 and 1258. Arm 1252 including "thick-to-thin" L-shape cross-section rails 1254 depending therefrom and evenly offset from each other along arm 1252 so as to form "thick-to-thin" L-shape cross-section spaces 1256 therebetween. Similarly, arm 1258 includes "thick-to-thin" L-shape cross-section rails 1260 depending therefrom and evenly offset from each other along arm 1258 so as to form "thick-to-thin" L-shape cross-section spaces 1262 therebetween. The rails 1216 on arm 1212 of the first spacer component 1200 are accommodated in spaces 1262 on arm 1258 of the second spacer component 1250. Similarly, the rails 1220 on arm 1218 of the first spacer component 1200 are accommodated in spaces 1256 on arm 1252 of the second spacer component 1250. Also, the rails 1254 on arm 1252 of the second spacer component 1250 are accommodated in spaces 1222 on arm 1218 of the first spacer component 1200, and the rails 1260 on arm 1258 of the second spacer component 1250 are accommodated in spaces 1216 on arm 1212 of the first spacer component 1200.

The second spacer component 1250 is also depicted with channels 1266 and 1268, each of which serve a similar (if reciprocal) purpose, as described above, to channels 1226 and 1228 of the first spacer component 1200.

The configuration for producing the first selected spacer length "B" in FIGS. 18 and 19 has the four (4) rails 1214, 1220, 1254, and 1260 of each respective arm 1212, 1218, 1252, and 1258 of each of the respective first and second spacer components 1200 and 1250, which are distal-most from their respective bases 1224 and 1274, slidably engaging, respectively, with the four (4) spaces 1262, 1256, 1222, and 1216 of each respective arm 1212, 1218, 1252, and 1258 of each of the respective first and second spacer components 1200 and 1250, which are distal-most from their respective bases 1224 and 1274. It will also be noted that the fifth distal-most rail from the base on each arm (third rail away from the respective base) slides along a top part of the distal-most rail of the other spacer component arms.

In other embodiments, spacer components may have more than seven (7) rails. In yet other embodiments, spacer components may have less than seven (7) rails. In some example circumstances, spacer components with a different number of rails on respective arms can be used.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge.

The invention claimed is:

1. An adjustable mounting apparatus for connecting a utility vehicle deck or tray to a chassis of the utility vehicle, the vehicle having a longitudinal axis, a transverse axis and a vertical axis, the mounting apparatus comprising:
    chassis connectors at a lower portion of the mounting apparatus for connecting the chassis of the utility vehicle to the mounting apparatus;
    two or more transverse rails, which are substantially parallel to the transverse axis of the vehicle when the mounting apparatus is connected to the vehicle, the transverse rails being connected to the chassis connectors;
    two or more longitudinal rails, which are substantially parallel to the longitudinal axis of the vehicle when the mounting apparatus is connected to the vehicle, the longitudinal rails being located above the transverse rails, the longitudinal rails being capable of being connected to the vehicle deck or tray;
    each of the transverse rails being coupled to the longitudinal rails by brackets, the brackets being slidable along the each of rails, and securable into a fixed position on the rails,
    whereby, when the brackets are slidable along the rails, the position of longitudinal rails can be adjusted to align and facilitate connection of the mounting apparatus to the vehicle deck or tray.

2. The adjustable mounting apparatus according to claim 1 wherein the height of one or more of the chassis connectors can be altered and thereby change the vertical position of the connected transverse rails.

3. The adjustable mounting apparatus according to claim 2 wherein the chassis connector comprises a column and spacers can be inserted into the column to adjust its height.

4. The adjustable mounting apparatus according to claim 2 wherein the chassis connector has a threaded mechanism which is adjustable to alter the height of the connector.

5. The adjustable mounting apparatus according to claim 4 wherein threaded mechanism includes a first section with an external thread and a second section with an internal thread.

6. The adjustable mounting apparatus according to claim 2 wherein the chassis connector comprises an adjustable spacer comprising two spacer components, each spacer component comprising at least one arm having a plurality of substantially parallel rails depending therefrom.

7. The adjustable mounting apparatus according to claim 1 wherein the longitudinal and transverse rails have one or more channels on at least one side of the rails.

8. The adjustable mounting apparatus according to claim 7 wherein longitudinal and transverse rails each have at least two channels on a side of the rail.

9. The adjustable mounting apparatus according to claim 8 wherein in cross section the channel has an internal width which is wider than channel mouth.

10. The adjustable mounting apparatus according to claim 7 wherein longitudinal and transverse rails have the same cross section profile.

11. The adjustable mounting apparatus according to claim 1 wherein the slidable brackets comprises a first face which abuts a side of a longitudinal rail and further comprises a second face which abuts a top of a rail of a transverse rail.

12. The adjustable mounting apparatus according to claim 11 wherein the first face and second face are orthogonal with respect to each other.

13. The adjustable mounting apparatus according to claim 7 wherein the slidable bracket operates with at least one guide and the guide is slidably held within the channels.

14. The adjustable mounting apparatus according to claim 13 wherein the slidable bracket is secured to the guide by one or more fasteners such as bolts.

15. The adjustable mounting apparatus according to claim 13 wherein the guide protrudes from the channel and the slidable bracket is fastened to guide.

16. The adjustable mounting apparatus according to claim 7 wherein the slidable bracket operates with fasteners which protrude into the channel and are slidably retained by the channel.

* * * * *